(12) United States Patent
Opris et al.

(10) Patent No.: US 8,754,694 B2
(45) Date of Patent: Jun. 17, 2014

(54) ACCURATE NINETY-DEGREE PHASE SHIFTER

(71) Applicant: Fairchild Semiconductor Corporation, San Jose, CA (US)

(72) Inventors: Ion Opris, San Jose, CA (US); Shungneng Lee, Sunnyvale, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/746,016

(22) Filed: Jan. 21, 2013

(65) Prior Publication Data
US 2013/0257487 A1    Oct. 3, 2013

Related U.S. Application Data

(60) Provisional application No. 61/619,604, filed on Apr. 3, 2012.

(51) Int. Cl.
*H03H 11/16*    (2006.01)

(52) U.S. Cl.
USPC ............................................ 327/254; 327/231

(58) Field of Classification Search
None
See application file for complete search history.

(56) References Cited

U.S. PATENT DOCUMENTS

| | | | |
|---|---|---|---|
| 5,487,305 A | 1/1996 | Ristic et al. | |
| 5,723,790 A | 3/1998 | Andersson | |
| 5,751,154 A | 5/1998 | Tsugai | |
| 5,760,465 A | 6/1998 | Alcoe et al. | |
| 6,214,644 B1 | 4/2001 | Glenn | |
| 6,301,965 B1 * | 10/2001 | Chu et al. | 73/514.18 |
| 6,351,996 B1 | 3/2002 | Nasiri et al. | |
| 6,366,468 B1 | 4/2002 | Pan | |
| 6,390,905 B1 | 5/2002 | Korovin et al. | |
| 6,501,282 B1 | 12/2002 | Dummermuth et al. | |
| 6,504,385 B2 | 1/2003 | Hartwell | |

(Continued)

FOREIGN PATENT DOCUMENTS

| | | |
|---|---|---|
| CN | 102597699 A | 7/2012 |
| CN | 103209922 A | 7/2013 |

(Continued)

OTHER PUBLICATIONS

"U.S. Appl. No. 12/849,742, Response filed Jan. 23, 2012 to Non Final Office Action mailed Aug. 23, 2012", 10 pgs.

(Continued)

*Primary Examiner* — Cassandra Cox
(74) *Attorney, Agent, or Firm* — Schwegman, Lundberg & Woessner P.A.

(57) ABSTRACT

An apparatus includes a drive signal circuit for MEMS sensor. The drive signal circuit includes an input configured to receive a voltage signal representative of charge generated by the MEMS sensor, a phase-shift circuit electrically coupled to the input and configured to phase shift an input signal by substantially ninety degrees, and a comparator circuit with hysteresis. An input of the comparator is electrically coupled to an output of the phase-shift circuit and an output of the comparator circuit is electrically coupled to an output of the drive signal circuit. A feedback loop extends from the output of the drive signal circuit to the input of the phase-shift circuit and is configured to generate a self-oscillating signal at an output of the drive signal circuit. An output signal generated by the drive signal circuit is applied to a drive input of the MEMS sensor.

24 Claims, 8 Drawing Sheets

(56) References Cited

U.S. PATENT DOCUMENTS

| | | |
|---|---|---|
| 6,553,835 B1 | 4/2003 | Hobbs et al. |
| 6,725,719 B2 | 4/2004 | Cardarelli |
| 6,781,231 B2 | 8/2004 | Minervini et al. |
| 6,848,304 B2 | 2/2005 | Geen |
| 7,051,590 B1 | 5/2006 | Lemkin et al. |
| 7,093,487 B2 | 8/2006 | Mochida |
| 7,166,910 B2 | 1/2007 | Minervini et al. |
| 7,202,552 B2 | 4/2007 | Zhe et al. |
| 7,210,351 B2 | 5/2007 | Lo et al. |
| 7,221,767 B2 | 5/2007 | Mullenborn et al. |
| 7,240,552 B2 | 7/2007 | Acar et al. |
| 7,258,011 B2 | 8/2007 | Nasiri et al. |
| 7,258,012 B2 | 8/2007 | Xie et al. |
| 7,293,460 B2 | 11/2007 | Zarabadi et al. |
| 7,301,212 B1 | 11/2007 | Mian et al. |
| 7,305,880 B2 | 12/2007 | Caminada et al. |
| 7,358,151 B2 | 4/2008 | Araki et al. |
| 7,436,054 B2 | 10/2008 | Zhe |
| 7,449,355 B2 | 11/2008 | Lutz et al. |
| 7,451,647 B2 * | 11/2008 | Matsuhisa et al. ......... 73/514.18 |
| 7,518,493 B2 | 4/2009 | Bryzek et al. |
| 7,539,003 B2 | 5/2009 | Ray et al. |
| 7,600,428 B2 | 10/2009 | Robert et al. |
| 7,622,782 B2 | 11/2009 | Chu et al. |
| 7,706,149 B2 | 4/2010 | Yang et al. |
| 7,781,249 B2 | 8/2010 | Laming et al. |
| 7,795,078 B2 | 9/2010 | Ramakrishna et al. |
| 7,950,281 B2 | 5/2011 | Hammerschmidt |
| 8,006,557 B2 | 8/2011 | Yin et al. |
| 8,113,050 B2 | 2/2012 | Acar et al. |
| 8,171,792 B2 | 5/2012 | Sameshima |
| 8,201,449 B2 | 6/2012 | Ohuchi et al. |
| 8,250,921 B2 | 8/2012 | Nasiri et al. |
| 8,421,168 B2 | 4/2013 | Allen et al. |
| 2002/0021059 A1 | 2/2002 | Knowles et al. |
| 2002/0178831 A1 | 12/2002 | Takada |
| 2003/0061878 A1 | 4/2003 | Pinson |
| 2003/0200807 A1 | 10/2003 | Hulsing, II |
| 2004/0119137 A1 | 6/2004 | Leonardi et al. |
| 2004/0177689 A1 | 9/2004 | Cho et al. |
| 2004/0211258 A1 | 10/2004 | Geen |
| 2004/0219340 A1 | 11/2004 | McNeil et al. |
| 2004/0231420 A1 | 11/2004 | Xie et al. |
| 2004/0251793 A1 | 12/2004 | Matsuhisa |
| 2005/0005698 A1 | 1/2005 | McNeil et al. |
| 2005/0139005 A1 | 6/2005 | Geen |
| 2005/0189635 A1 | 9/2005 | Humpston et al. |
| 2006/0032308 A1 | 2/2006 | Acar et al. |
| 2006/0034472 A1 | 2/2006 | Bazarjani et al. |
| 2006/0043608 A1 | 3/2006 | Bernier et al. |
| 2006/0137457 A1 | 6/2006 | Zdeblick |
| 2006/0213265 A1 | 9/2006 | Weber et al. |
| 2006/0213266 A1 | 9/2006 | French et al. |
| 2006/0213268 A1 | 9/2006 | Asami et al. |
| 2006/0246631 A1 | 11/2006 | Lutz et al. |
| 2007/0013052 A1 | 1/2007 | Zhe et al. |
| 2007/0040231 A1 | 2/2007 | Harney et al. |
| 2007/0047744 A1 | 3/2007 | Harney et al. |
| 2007/0071268 A1 | 3/2007 | Harney et al. |
| 2007/0099327 A1 | 5/2007 | Hartzell et al. |
| 2007/0114643 A1 | 5/2007 | DCamp et al. |
| 2007/0165888 A1 | 7/2007 | Weigold |
| 2007/0205492 A1 | 9/2007 | Wang |
| 2007/0220973 A1 | 9/2007 | Acar |
| 2007/0222021 A1 | 9/2007 | Yao |
| 2007/0284682 A1 | 12/2007 | Laming et al. |
| 2008/0049230 A1 | 2/2008 | Chin et al. |
| 2008/0081398 A1 | 4/2008 | Lee et al. |
| 2008/0083958 A1 | 4/2008 | Wei et al. |
| 2008/0083960 A1 | 4/2008 | Chen et al. |
| 2008/0092652 A1 | 4/2008 | Acar |
| 2008/0157238 A1 | 7/2008 | Hsiao |
| 2008/0157301 A1 | 7/2008 | Ramakrishna et al. |
| 2008/0202237 A1 | 8/2008 | Hammerschmidt |
| 2008/0245148 A1 | 10/2008 | Fukumoto |
| 2008/0247585 A1 | 10/2008 | Leidl et al. |
| 2008/0251866 A1 | 10/2008 | Belt et al. |
| 2008/0290756 A1 | 11/2008 | Huang |
| 2008/0302559 A1 | 12/2008 | Leedy |
| 2008/0314147 A1 | 12/2008 | Nasiri et al. |
| 2009/0064780 A1 | 3/2009 | Coronato et al. |
| 2009/0140606 A1 | 6/2009 | Huang |
| 2009/0175477 A1 | 7/2009 | Suzuki et al. |
| 2009/0183570 A1 | 7/2009 | Acar et al. |
| 2009/0194829 A1 | 8/2009 | Chung et al. |
| 2009/0263937 A1 | 10/2009 | Ramakrishna et al. |
| 2009/0266163 A1 | 10/2009 | Ohuchi et al. |
| 2010/0019393 A1 | 1/2010 | Hsieh et al. |
| 2010/0024548 A1 | 2/2010 | Cardarelli |
| 2010/0038733 A1 | 2/2010 | Minervini |
| 2010/0044853 A1 | 2/2010 | Dekker et al. |
| 2010/0052082 A1 | 3/2010 | Lee |
| 2010/0072626 A1 | 3/2010 | Theuss et al. |
| 2010/0155863 A1 | 6/2010 | Weekamp |
| 2010/0206074 A1 | 8/2010 | Yoshida et al. |
| 2010/0224004 A1 | 9/2010 | Suminto et al. |
| 2010/0236327 A1 | 9/2010 | Mao et al. |
| 2011/0030473 A1 | 2/2011 | Acar |
| 2011/0030474 A1 | 2/2011 | Kuang et al. |
| 2011/0031565 A1 | 2/2011 | Marx et al. |
| 2011/0094302 A1 | 4/2011 | Schofield et al. |
| 2011/0121413 A1 | 5/2011 | Allen et al. |
| 2011/0265564 A1 | 11/2011 | Acar et al. |
| 2013/0139591 A1 | 6/2013 | Acar |
| 2013/0139592 A1 | 6/2013 | Acar |
| 2013/0192364 A1 | 8/2013 | Acar |
| 2013/0192369 A1 | 8/2013 | Acar et al. |
| 2013/0247666 A1 | 9/2013 | Acar |
| 2013/0247668 A1 | 9/2013 | Bryzek |
| 2013/0250532 A1 | 9/2013 | Bryzek et al. |

FOREIGN PATENT DOCUMENTS

| | | |
|---|---|---|
| CN | 103210278 A | 7/2013 |
| CN | 103221331 A | 7/2013 |
| CN | 103221332 A | 7/2013 |
| CN | 103221333 A | 7/2013 |
| CN | 103221778 A | 7/2013 |
| CN | 103221779 A | 7/2013 |
| CN | 103221795 A | 7/2013 |
| CN | 103238075 A | 8/2013 |
| EP | 1460380 A1 | 9/2004 |
| EP | 1521086 A1 | 4/2005 |
| EP | 1688705 A2 | 8/2006 |
| EP | 1860402 A1 | 11/2007 |
| EP | 2259019 A1 | 12/2010 |
| JP | 09089927 A | 4/1997 |
| JP | 10239347 A | 9/1998 |
| JP | 2005024310 A | 1/2005 |
| JP | 2005114394 A | 4/2005 |
| JP | 2005294462 A | 10/2005 |
| JP | 2007024864 A | 2/2007 |
| JP | 2009075097 A | 4/2009 |
| JP | 2010025898 A | 2/2010 |
| JP | 2010506182 A | 2/2010 |
| KR | 1020110055449 A1 | 5/2011 |
| KR | 1020130052652 A | 5/2013 |
| KR | 1020130052653 A | 5/2013 |
| KR | 1020130054441 A | 5/2013 |
| KR | 1020130055693 A | 5/2013 |
| KR | 1020130057485 A | 5/2013 |
| KR | 1020130060338 A | 6/2013 |
| KR | 1020130061181 A | 6/2013 |
| KR | 1020130097209 A | 9/2013 |
| KR | 1020130139914 A | 12/2013 |
| WO | WO-2008059757 A1 | 5/2008 |
| WO | WO-2008087578 A2 | 7/2008 |
| WO | WO-2011016859 A2 | 2/2011 |
| WO | WO-2011016859 A3 | 2/2011 |
| WO | WO-2012037492 A2 | 3/2012 |
| WO | WO-2012037492 A3 | 3/2012 |
| WO | WO-2012037501 A2 | 3/2012 |
| WO | WO-2012037501 A3 | 3/2012 |
| WO | WO-2012037536 A2 | 3/2012 |

(56) References Cited

FOREIGN PATENT DOCUMENTS

| WO | WO-2012037537 A2 | 3/2012 |
|---|---|---|
| WO | WO-2012037538 A2 | 3/2012 |
| WO | WO-2012037539 A1 | 3/2012 |
| WO | WO-2012037539 A9 | 3/2012 |
| WO | WO-2012037540 A2 | 3/2012 |
| WO | WO-2012040194 A1 | 3/2012 |
| WO | WO-2012040211 A2 | 3/2012 |
| WO | WO-2012040245 A2 | 3/2012 |
| WO | WO-2012040245 A3 | 3/2012 |
| WO | WO-2013115967 A1 | 8/2013 |
| WO | WO-2013116356 A1 | 8/2013 |
| WO | WO-2013116514 A1 | 8/2013 |
| WO | WO-2013116522 A1 | 8/2013 |

OTHER PUBLICATIONS

"U.S. Appl. No. 12/849,787, Non Final Office Action mailed May 28, 2013", 18 pgs.
"U.S. Appl. No. 12/947,543, Notice of Allowance mailed Dec. 17, 2012", 11 pgs.
"U.S. Appl. No. 13/813,443, Preliminary Amendment mailed Jan. 31, 2013", 3 pgs.
"U.S. Appl. No. 13/821,586, Preliminary Amendment mailed Mar. 8, 2013", 6 pgs.
"U.S. Appl. No. 13/821,589, Preliminary Amendment mailed Mar. 8, 2013", 6 pgs.
"U.S. Appl. No. 13/821,598, Preliminary Amendment mailed Mar. 8, 2013", 7 pgs.
"U.S. Appl. No. 13/821,609, Preliminary Amendment mailed Mar. 8, 2013", 3 pgs.
"U.S. Appl. No. 13/821,612, Preliminary Amendment mailed Mar. 8, 2013", 3 pgs.
"U.S. Appl. No. 13/821,619, Preliminary Amendment mailed Mar. 8, 2013", 3 pgs.
"U.S. Appl. No. 13/821,793, Preliminary Amendment mailed Mar. 8, 2013", 3 pgs.
"U.S. Appl. No. 13/821,842, Preliminary Amendment mailed Mar. 8, 2013", 3 pgs.
"U.S. Appl. No. 13/821,853, Preliminary Amendment mailed Mar. 8, 2013", 3 pgs.
"Application Serial No. PCT/US2011/051994, International Republished Application mailed Jun. 7, 2012", 1 pg.
"DigiSiMic™ Digital Silicon Microphone Pulse Part Number: TC100E", TC100E Datasheet version 4.2 DigiSiMic™ Digital Silicon Microphone. (Jan. 2009), 6 pgs.
"EPCOS MEMS Microphone With TSV", 1 pg.
"International Application Serial No. PCT/US2011/051994, International Preliminary Report on Patentability mailed Mar. 28, 2013", 8 pgs.
"International Application Serial No. PCT/US2011/052340, International Preliminary Report on Patentability mailed Apr. 4, 2013", 5 pgs.
"International Application Serial No. PCT/US2011/052340, Search Report mailed Feb. 29, 2012", 3 pgs.
"International Application Serial No. PCT/US2011/052340, Written Opinion mailed Feb. 29, 2012", 3 pgs.
"International Application Serial No. PCT/US2011/052369, International Preliminary Report on Patentability mailed Apr. 4, 2013", 5 pgs.
"International Application Serial No. PCT/US2013/021411, International Search Report mailed Apr. 30, 2013", 5 pgs.
"International Application Serial No. PCT/US2013/021411, Written Opinion mailed Apr. 30, 2013", 5 pgs.
"International Application Serial No. PCT/US2013/023877, International Search Report mailed May 14, 2013", 3 pgs.
"International Application Serial No. PCT/US2013/023877, Written Opinion mailed May 14, 2013", 5 pgs.
"International Application Serial No. PCT/US2013/024149, Written Opinion mailed", 4 pages.
"International Application Serial No. PCT/US2013/024149, International Search Report mailed", 7 pages.
"T4020 & T4030 MEMS Microphones for Consumer Electronics", Product Brief 2010, Edition Feb. 2010, (2010), 2 pgs.
Acar, Cenk, et al., "Chapter 4: Mechanical Design of MEMS Gyroscopes", MEMS Vibratory Gyroscopes: Structural Approaches to Improve Robustness, Springer, (2009), 73-110.
Acar, Cenk, et al., "Chapter 6: Linear Multi DOF Architecture—Sections 6.4 and 6.5", MEMS Vibratory Gyroscopes: Structural Approaches to Improve Robustness, Springer, (2009), 158-178.
Acar, Cenk, et al., "Chapter 7: Torsional Multi-DOF Architecture", MEMS Vibratory Gyroscopes: Structural Approaches to Improve Robustness, Springer, (209), 187-206.
Acar, Cenk, et al., "Chapter 8: Distributed-Mass Architecture", MEMS Vibratory Gyroscopes: Structural Approaches to Improve Robustness, Springer, (2009), 207-224.
Acar, Cenk, et al., "Chapter 9: Conclusions and Future Trends", MEMS Vibratory Gyroscopes: Structural Approaches to Improve Robustness, Springer, (2009), 225-245.
Krishnamurthy, Rajesh, et al., "Drilling and Filling, but not in your Dentist's Chair a look at some recent history of multi-chip and through silicon via (TSV) technology", Chip Design Magazine, (Oct./Nov. 2008), 7 pgs.
"U.S. Appl. No. 12/849,742, Response filed Sep. 30, 2013 to Non-Final Office Action mailed Mar. 28, 2013", 12 pgs.
"Chinese Application Serial No. 201180053926.1, Amendment filed Aug. 21, 2013", w/English Translation, 13 pgs.
"Chinese Application Serial No. 201180055309.5, Voluntary Amendment filed Aug. 23, 2013", w/English Translation, 13 pgs.
"Chinese Application Serial No. 201320165465.3, Office Action mailed Jul. 22, 2013", w/English Translation, 2 pgs.
"Chinese Application Serial No. 201320165465.3, Response filed Aug. 7, 2013 to Office Action mailed Jul. 22, 2013", w/English Translation, 39 pgs.
"Chinese Application Serial No. 201320171504.0, Office Action mailed Jul. 22, 2013", w/English Translation, 3 pgs.
"Chinese Application Serial No. 201320171504.0, Response filed Jul. 25, 2013 to Office Action mailed Jul. 22, 2013", w/English Translation, 33 pgs.
"Chinese Application Serial No. 201320171616.6, Office Action mailed Jul. 10, 2013", w/English Translation, 2 pgs.
"Chinese Application Serial No. 201320171757.8, Office Action mailed Jul. 11, 2013", w/English Translation, 2 pgs.
"Chinese Application Serial No. 201320171757.8, Response filed Jul. 25, 2013 to Office Action mailed Jul. 11, 2013", w/English Translation, 21 pgs.
"Chinese Application Serial No. 201320172128.7, Office Action mailed Jul. 12, 2013", w/English Translation, 3 pgs.
"Chinese Application Serial No. 201320172366.8, Office Action mailed Jul. 9, 2013", w/English Translation, 3 pgs.
"Chinese Application Serial No. 201320172366.8, Response filed Sep. 16, 2013 to Office Action mailed Jul. 9, 2013", w/English Translation, 24 pgs.
"Chinese Application Serial No. 201320172367.2, Office Action mailed Jul. 9, 2013", w/English Translation, 2 pgs.
"Chinese Application Serial No. 201320172367.2, Response filed Sep. 16, 2013 to Office Action mailed Jul. 9, 2013", w/English Translation, 24 pgs.
"Chinese Application Serial No. 201320185461.1, Office Action mailed Jul. 23, 2013", w/English Translation, 3 pgs.
"Chinese Application Serial No. 201320185461.1, Response filed Sep. 10, 2013 to Office Action mailed Jul. 23, 2013", w/English Translation, 25 pgs.
"Chinese Application Serial No. 201320186292.3, Office Action mailed Jul. 19, 2013", w/English Translation, 2 pgs.
"Chinese Application Serial No. 201320186292.3, Response filed Sep. 10, 2013 to Office Action mailed Jul. 19, 2013", w/English Translation, 23 pgs.
"European Application Serial No. 13001692.6, European Search Report mailed 07-13-24", 5 pgs.
"European Application Serial No. 13001696.7, Extended European Search Report mailed Aug. 6, 2013", 4 pgs.

(56) References Cited

OTHER PUBLICATIONS

"European Application Serial No. 13001721.3, European Search Report mailed Jul. 18, 2013", 9 pgs.
"International Application Serial No. PCT/US2013/024138, International Search Report mailed May 24, 2013", 3 pgs.
"International Application Serial No. PCT/US2013/024138, Written Opinion mailed May 24, 2013", 4 pgs.
"Korean Application Serial No. 10-2013-7009775, Office Action mailed Sep. 17, 2013", w/English Translation, 6 pgs.
"Korean Application Serial No. 10-2013-7009777, Office Action mailed Sep. 17, 2013", w/English Translation, 8 pgs.
"Korean Application Serial No. 10-2013-7009788, Office Action mailed Aug. 29, 2013", w/English Translation, 6 pgs.
"Korean Application Serial No. 10-2013-7009790, Office Action mailed Jun. 26, 2013", W/English Translation, 7 pgs.
"Korean Application Serial No. 10-2013-7009790, Response filed Aug. 26, 2013 to Office Action mailed Jun. 26, 2013", w/English Claims, 11 pgs.
"Korean Application Serial No. 10-2013-7010143, Office Action mailed May 28, 2013", w/English Translation, 5 pgs.
"Korean Application Serial No. 10-2013-7010143, Response filed Jul. 24, 2013 to Office Action mailed May 28, 2013", w/English Claims, 14 pgs.
Ferreira, Antoine, et al., "A Survey of Modeling and Control Techniques for Micro- and Nanoelectromechanical Systems", IEEE Transactions on Systems, Man and Cybernetics—Part C: Applications and Reviews vol. 41, No. 3., (May 2011), 350-364.
Fleischer, Paul E, "Sensitivity Minimization in a Single Amplifier Biquad Circuit", IEEE Transactions on Circuits and Systems. vol. Cas-23, No. 1, (1976), 45-55.
Reljin, Branimir D, "Properties of SAB filters with the two-pole single-zero compensated operational amplifier", Circuit Theory and Applications: Letters to the Editor. vol. 10, (1982), 277-297.
Sedra, Adel, et al., "Chapter 8.9: Effect of Feedback on the Amplifier Poles", Microelectronic Circuits, 5th edition, (2004), 836-864.
Song-Hee, Cindy Paik, "A MEMS-Based Precision Operational Amplifier", Submitted to the Department of Electrical Engineering and Computer Sciences MIT, [Online]. Retrieved from the Internet: <URL: http://dspace.mit.edu/bitstream/handle/1721.1/16682/57138272.pdf?...>, (Jan. 1, 2004), 123 pgs.
"U.S. Appl. No. 12/849,742, Non Final Office Action mailed Mar. 28, 2013", 9 pgs.
"U.S. Appl. No. 12/849,742, Non Final Office Action mailed Aug. 23, 2012", 9 pgs.
"U.S. Appl. No. 12/849,787, Response filed Feb. 4, 2013 to Restriction Requirement mailed Oct. 4, 2012", 7 pgs.
"U.S. Appl. No. 12/849,787, Restriction Requirement mailed Oct. 4, 2012", 5 pgs.
"Application Serial No. PCT/US2011/052006, International Republished Application mailed Jun. 7, 2012", 1 pg.
"Application Serial No. PCT/US2011/052417, International Republished Application mailed Jun. 7, 2012", 1 pg.
"International Application Serial No. PCT/US2010/002166, International Preliminary Report on Patentability mailed Feb. 16, 2012", 6 pgs.
"International Application Serial No. PCT/US2010/002166, International Search Report mailed Feb. 28, 2011", 3 pgs.
"International Application Serial No. PCT/US2010/002166, Written Opinion mailed Feb. 28, 2011", 4 pgs.
"International Application Serial No. PCT/US2011/051994, International Search Report mailed Apr. 16, 2012", 3 pgs.
"International Application Serial No. PCT/US2011/051994, Written Opinion mailed Apr. 16, 2012", 6 pgs.
"International Application Serial No. PCT/US2011/052006, International Preliminary Report on Patentability mailed Mar. 28, 2013", 7 pgs.
"International Application Serial No. PCT/US2011/052006, Search Report mailed Apr. 16, 2012", 3 pgs.
"International Application Serial No. PCT/US2011/052006, Written Opinion mailed Apr. 16, 2012", 5 pgs.
"International Application Serial No. PCT/US2011/052059, International Preliminary Report on Patentability mailed Jan. 22, 2013", 14 pgs.
"International Application Serial No. PCT/US2011/052059, Search Report mailed Apr. 20, 2012", 4 pgs.
"International Application Serial No. PCT/US2011/052059, Written Opinion mailed Apr. 20, 2012", 7 pgs.
"International Application Serial No. PCT/US2011/052060, International Preliminary Report on Patentability mailed Jan. 22, 2013", 12 pgs.
"International Application Serial No. PCT/US2011/052060, International Search Report Apr. 20, 2012", 3 pgs.
"International Application Serial No. PCT/US2011/052060, Written Opinion mailed Apr. 20, 2012", 7 pgs.
"International Application Serial No. PCT/US2011/052061, International Preliminary Report on Patentability mailed Mar. 28, 2013", 6 pgs.
"International Application Serial No. PCT/US2011/052061, International Search Report mailed Apr. 10, 2012", 3 pgs.
"International Application Serial No. PCT/US2011/052061, Written Opinion mailed Apr. 10, 2012", 4 pgs.
"International Application Serial No. PCT/US2011/052064, International Preliminary Report on Patentability mailed Mar. 28, 2013", 5 pgs.
"International Application Serial No. PCT/US2011/052064, Search Report mailed Feb. 29, 2012", 3 pgs.
"International Application Serial No. PCT/US2011/052064, Written Opinion mailed Feb. 29, 2012", 3 pgs.
"International Application Serial No. PCT/US2011/052065, International Preliminary Report on Patentability mailed Mar. 28, 2013", 7 pgs.
"International Application Serial No. PCT/US2011/052065, International Search Report mailed Apr. 10, 2012", 3 pgs.
"International Application Serial No. PCT/US2011/052065, Written Opinion mailed Apr. 10, 2012", 5 pgs.
"International Application Serial No. PCT/US2011/052369, International Search Report mailed Apr. 24, 2012", 6 pgs.
"International Application Serial No. PCT/US2011/052369, Written Opinion mailed Apr. 24, 2012", 3 pgs.
"International Application Serial No. PCT/US2011/052417, International Preliminary Report on Patentability mailed Apr. 4, 2013", 6 pgs.
"International Application Serial No. PCT/US2011/052417, International Search Report mailed Apr. 23, 2013", 5 pgs.
"International Application Serial No. PCT/US2011/052417, Written Opinion mailed Apr. 23, 2012", 4 pgs.
Beyne, E, et al., "Through-silicon via and die stacking technologies for microsystems-integration", IEEE International Electron Devices Meeting, 2008. IEDM 2008., (Dec. 2008), 1-4.
Cabruja, Enric, et al., "Piezoresistive Accelerometers for MCM-Package-Part II", The Packaging Journal of Microelectromechanical Systems. vol. 14, No. 4, (Aug. 2005), 806-811.
Ezekwe, Chinwuba David, "Readout Techniques for High-Q Micromachined Vibratory Rate Gyroscopes", Electrical Engineering and Computer Sciences University of California at Berkeley, Technical Report No. UCB/EECS-2007-176, http://www.eecs.berkeley.edu/Pubs/TechRpts/2007/EECS-2007-176.html, (Dec. 21, 2007), 94 pgs.
Rimskog, Magnus, "Through Wafer Via Technology for MEMS and 3D Integration", 32nd IEEE/CPMT International Electronic Manufacturing Technology Symposium, 2007. IEMT '07., (2007), 286-289.
"Chinese Application Serial No. 201320172366.8, Response filed Dec. 24, 2013 to Office Action mailed Oct. 25, 2013", 11 pgs.
"European Application Serial No. 10806751.3, Extended European Search Report mailed Jan. 7, 2014", 7 pgs.
"Korean Application Serial No. 10-2013-7009777, Office Action mailed Jan. 27, 2014", 5 pgs.
"U.S. Appl. No. 13/362,955, Response filed Feb. 17, 2014 to Restriction Requirement mailed Dec. 17, 2013", 9 pgs.
"U.S. Appl. No. 13/363,537, Non Final Office Action mailed Feb. 6, 2014", 10 pgs.

(56) References Cited

OTHER PUBLICATIONS

"U.S. Appl. No. 13/742,942, Notice of Allowance mailed Jan. 28, 2014", 9 pgs.

"U.S. Appl. No. 13/755,841, Restriction Requirement mailed Feb. 21, 2014", 6 pgs.

* cited by examiner

ACCURATE NINETY-DEGREE PHASE SHIFTER

CLAIM OF PRIORITY

This application claims the benefit of priority under 35 U.S.C. §119(e) of Opris et al., U.S. Provisional Patent Application Ser. No. 61/619,604, filed on Apr. 3, 2012, the benefit of priority of which is claimed hereby, and is incorporated by reference herein in its entirety.

BACKGROUND

Micro-electromechanical systems (MEMS) include small mechanical devices performing electrical and mechanical functions that are fabricated using photo-lithography techniques similar to techniques used to fabricate integrated circuits. Some MEMS devices are sensors that can detect motion such as an accelerometer or detect angular rate such as a gyroscope.

MEMS gyroscopes have become widely available and multi-axis gyroscope MEMS structures can be integrated into one device. The size and complexity of MEMS gyroscope sensors can still be considered excessive in certain applications, such as personal or mobile electronic devices. Further, the demand for three axis acceleration detection in consumer/mobile, automotive and aerospace/defense applications is constantly increasing. Consequently, it is desirable to reduce the size and complexity of drive and sense electronics for MEMS gyroscopes.

OVERVIEW

This document discusses, among other things, devices, systems, and methods to interface with MEMS sensors. An apparatus example includes a drive signal circuit for MEMS sensor. The drive signal circuit includes an input configured to receive a voltage signal representative of charge generated by the MEMS sensor, a phase-shift circuit electrically coupled to the input and configured to phase shift an input signal by substantially ninety degrees, and a comparator circuit with hysteresis. An input of the comparator is electrically coupled to an output of the phase-shift circuit and an output of the comparator circuit is electrically coupled to an output of the drive signal circuit. A feedback loop extends from the output of the drive signal circuit to the input of the phase-shift circuit, wherein the feedback loop is configured to generate a self-oscillating signal at an output of the drive signal circuit. An output signal generated by the drive signal circuit is applied to a drive input of the MEMS sensor.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example and not by way of limitation, various embodiments discussed in the present document.

DETAILED DESCRIPTION

Figure 1:
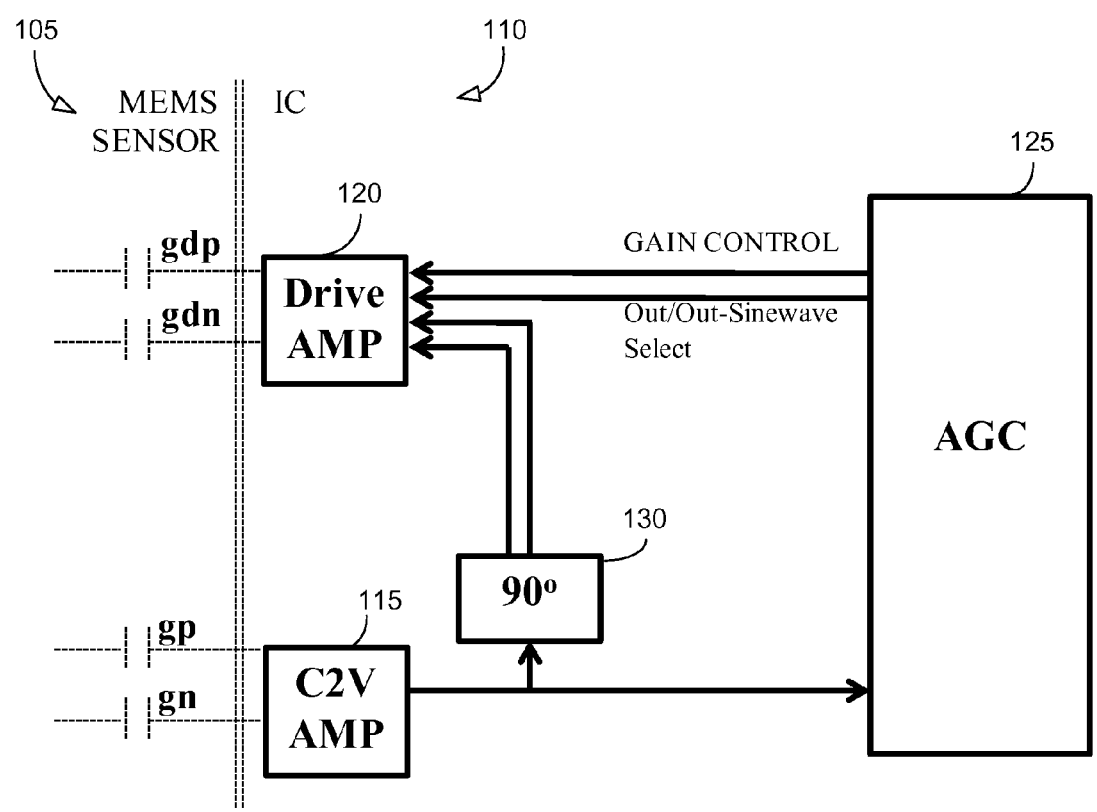
FIG. 1 is a block diagram of portions of an example of an electronic system that includes a MEMS sensor and an IC.

FIG. 1 is a block diagram of portions of an example of an electronic system that includes a MEMS sensor 105 and an IC 110. The MEMS sensor can include a MEMS gyroscope, such as a vibratory gyroscope for example. A vibratory gyroscope can include a proof mass that is suspended above a substrate. The proof mass oscillates mechanically in a drive direction and in a sense direction orthogonal to the drive direction. The proof mass is driven into resonance in the drive direction by an external drive source. When the gyroscope is subjected to an angular rotation, a Coriolis force is induced in the sense direction that is detected using sense capacitors. In the Figure, the capacitors gdp and gdn represent the drive input to the MEMS sensor 105 and capacitors gp and gn represent the sense signal output of the MEMS sensor 105.

The IC 110 includes circuits configured or designed to maintain the mechanical oscillation of the MEMS sensor 105 to a target mechanical oscillation. The circuits include a charge-to-voltage converter circuit 115 (C2V) and a sensor drive amplifier circuit 120. The C2V converts the charge generated by mechanical oscillation of the MEMS sensor into voltage. The sensor drive amplifier circuit 120 provides an electrostatic force to the sensor to cause mechanical oscillation. The IC 110 also includes an automatic gain control (AGC) circuit 125 and a drive signal circuit 130. The AGC circuit 125 adjusts the electrostatic force to maintain the mechanical oscillation to a target value.

The drive signal circuit 130 provides a reference drive signal to the sensor drive amplifier circuit 120. The reference drive signal can be based on the signal sensed from the MEMS sensor 105. Because sensing by the MEMS sensor is ninety degrees out of phase with the driving of the MEMS sensor, the sensed signal is phased shifted by substantially ninety degrees to generate the reference drive signal. However, when the electronic system first starts up or powers up, there is no drive signal available for the MEMS sensor 105 and consequently no sense signal from the MEMS sensor 105 with which to create a reference drive signal.

To create an initial reference drive signal, the drive signal circuit 130 generates an oscillating signal upon power up. Thus, a drive signal can be provided to the sensor drive amplifier circuit 120 even when a sense signal from the MEMS sensor 105 is not present.

This oscillating signal causes mechanical oscillation in the MEMS sensor 105 which in turn creates charge and generates a sense signal at the output of the C2V circuit. The initial drive signal can include multiple harmonic frequencies. When the generated sense signal reaches a threshold amplitude the reference drive signal is locked to the frequency of the generated sense signal. The sense signal generated by the MEMS sensor is a high-Q signal due to the mechanical resonance of the MEMS sensor 105, and using this signal results in results in a high Q reference drive signal.

Figure 2:
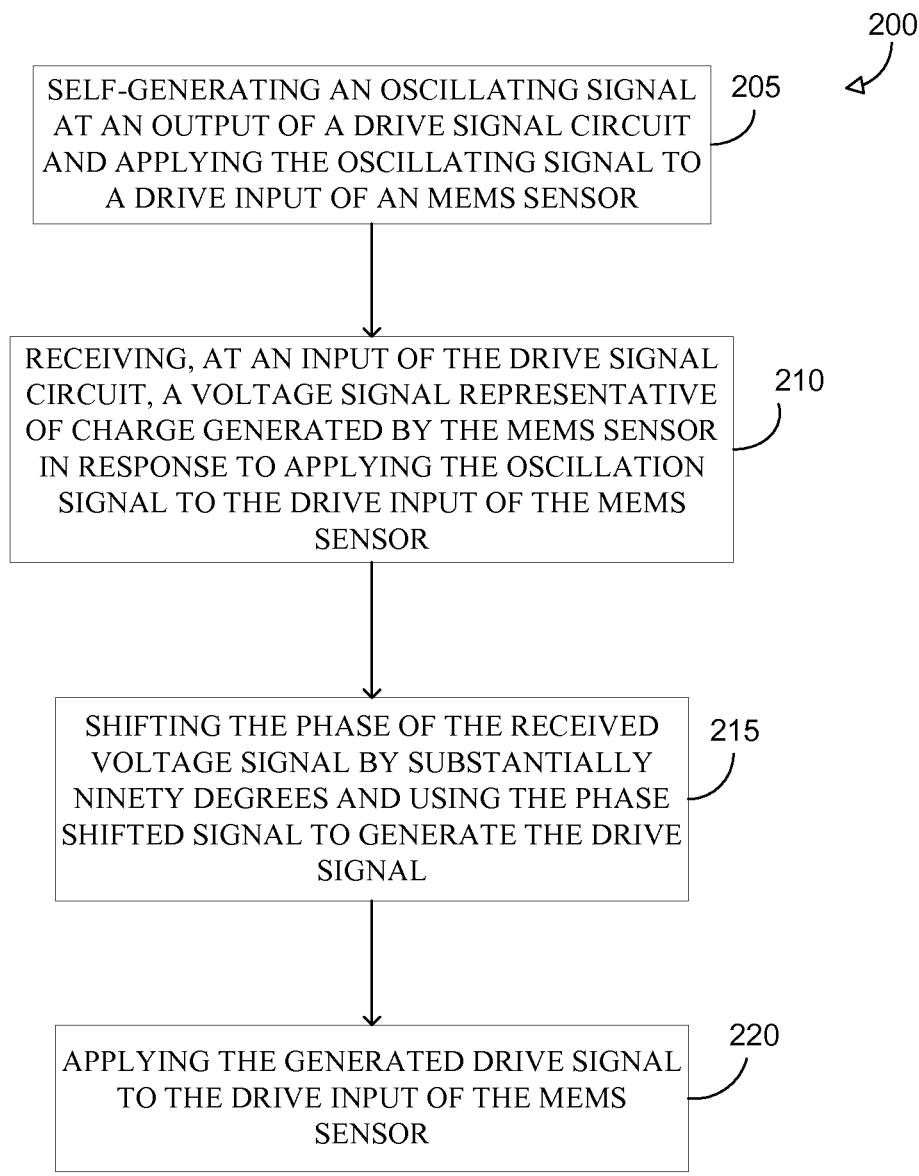
FIG. 2 is a flow diagram of a method of generating a drive signal for a MEMS sensor.

FIG. 2 is a flow diagram of a method 200 of generating a drive signal for a MEMS sensor, such as a MEMS gyroscope or gyro for example. At block 205, an oscillating signal is self-generated by a drive signal circuit at the output of the drive signal circuit. The oscillating signal is applied to a drive input of the MEMS sensor.

At block 210, in response to applying the oscillation signal to the drive input of the MEMS sensor, a voltage signal representative of charge generated by the MEMS sensor is received at an input of the drive signal circuit.

At block 215, the phase of the received voltage signal is shifted by substantially ninety degrees and the phase shifted signal is used to generate the drive signal instead of using the self-generated signal. At block 220, the generated drive signal is applied to the drive input of the MEMS sensor.

Figure 3:
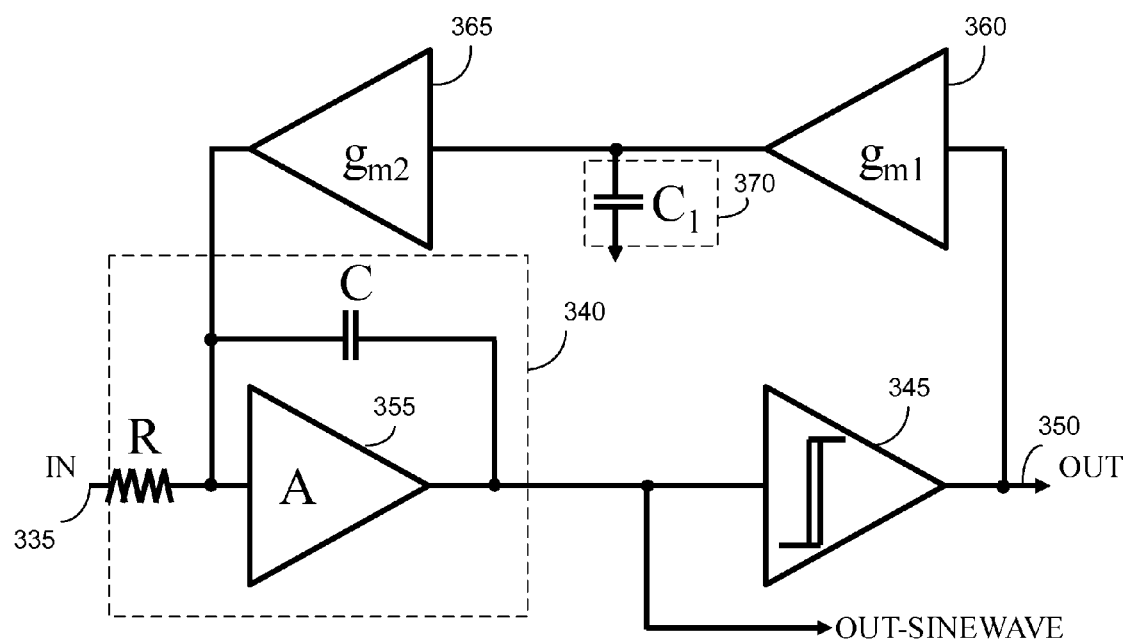
FIG. 3 is a circuit diagram of portions of an example of a drive signal circuit.

FIG. 3 is a circuit diagram of portions of an example of a drive signal circuit. The drive signal circuit provides a reference drive signal for the MEMS sensor. The drive signal circuit includes an input 335 that receives a voltage signal representative of charge generated by the MEMS sensor. In some examples, the voltage signal is received from a charge-to-voltage converter circuit.

The drive signal circuit also includes a phase-shift circuit 340 and a comparator circuit 345. The phase-shift circuit 340 can be electrically coupled to the input 335. The phase shift circuit 340 shifts the phase of an input signal by substantially ninety degrees) (90°). In some examples, the phase shift circuit 340 includes an integrator circuit. The comparator circuit 345 has hysteresis. The output of the comparator circuit 345 transitions from low to high when the input is greater than a first threshold, and the output transitions from high to low when the input is less than a second threshold that is different from the first threshold. The input of the comparator circuit 345 can be electrically coupled to the output of the phase-shift circuit 340, and the output of the comparator circuit 345 can be electrically coupled to the output 350 of the drive signal circuit.

The drive signal circuit includes a feedback loop that extends from the output of the drive signal circuit to an input of the phase-shift circuit 340. If the phase-shift circuit 340 includes an integrator circuit, the feedback loop can be electrically coupled from the output of the comparator circuit 345 to an input of an amplifier circuit 355 of the integrator circuit. As shown in the example of FIG. 3, the feedback loop can include a first transconductance amplifier circuit 360 (sometimes called an operational transconductance amplifier or OTA) having an input electrically coupled to the output of the comparator circuit 350, a second transconductance amplifier circuit 365 having an input electrically coupled to an output of the first transconductance amplifier circuit 360 and an output electrically coupled to an input of the phase-shift circuit 340. The feedback loop can include a capacitor 370 (C1) coupled to the output of the first transconductance amplifier circuit 360 and circuit ground.

The configuration of the feedback loop self-generates an oscillating signal or a self-oscillating signal at the output 350 of the drive signal circuit. The hysteretic comparator circuit maintains minimal amplitude of oscillation in the loop (at the integrator output) and controls the range of the self oscillation frequency. The binary output of the comparator charges/discharges the capacitor 370 through the first transconductance amplifier circuit 360. The error in the self-oscillating signal from a 50% duty cycle is stored onto the capacitor 370 and fed back to the phase-shift circuit 340 though the second transconductance amplifier circuit 365. This feedback arrangement corrects input signal offsets, amplifier offsets, and comparator offsets to provide a substantially 50% duty cycle output signal.

Output signals generated by the drive signal circuit are applied to a drive input of the MEMS sensor. The output signal provided as the reference drive signal can be a signal at drive circuit output 350 (OUT) or a signal at the output of the phase-shift circuit 340 (OUT-SINEWAVE). For the example shown in FIG. 1, the self oscillating signal of the drive signal circuit is selected by the AGC circuit 125 as the reference drive signal for the drive amplifier circuit 120 upon start-up. This self-generated oscillating signal is available at the circuit node labeled OUT in the drive signal circuit. When the amplitude of the sensed signal is sufficient (e.g., satisfies a predetermined signal threshold amplitude), the AGC circuit 125 may switch the reference drive signal from the signal available at OUT to the signal available at OUT-SINEWAVE as the reference drive signal. This is because after the amplitude threshold is achieved, the OUT-SINEWAVE provides a more harmonically pure (e.g., higher Q) reference drive signal for the MEMS sensor. The high-Q signal results in improved drive and mechanical resonance in the MEMS sensor due to fewer harmonic frequencies. The high Q signal at OUT-SINEWAVE provides an accurate 90 degree phase shift and a substantially 50% duty cycle.

If the phase-shift circuit 340 includes an integrator circuit, the feedback arrangement provides a stable operating point for the forward path integrator. The stable operating point avoids run-away problems that can result from integrating small offsets. Additionally, using an amplifier circuit 355 having a controlled signal gain for direct current (DC) signals minimizes the frequency shift of the self-oscillating signal over temperature. The feedback path should be designed to provide a large enough DC current to compensate for input signal offsets, but should have a very low alternating current (AC) gain to not disturb the ninety degree phase shift provided by the forward path integrator.

Figure 4:
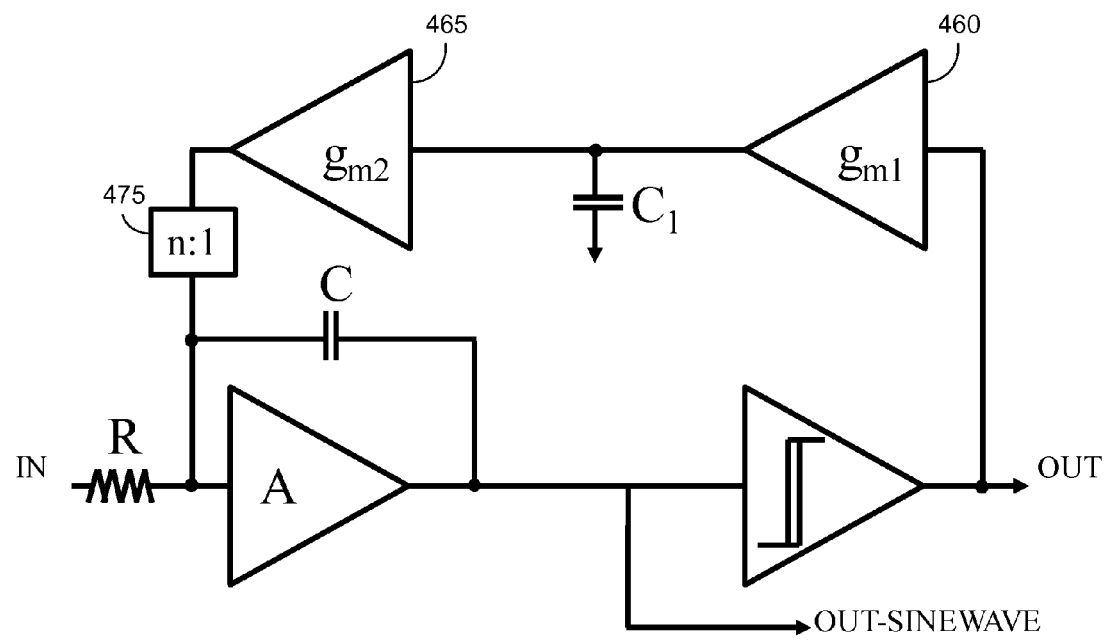
FIG. 4 is a circuit diagram of portions of another example of a drive signal circuit.

The design of the feedback loop can require values of transconductance gm for the second transconductance amplifier circuit that are difficult to realize. Small values of gm can be avoided by dividing the output current of the second transconductance amplifier before feeding the output current to the phase-shift circuit. FIG. 4 is a circuit diagram of portions of another example of a drive signal circuit having a feedback loop that includes a first transconductance amplifier circuit 460 and a second transconductance amplifier circuit 465. The drive signal circuit includes a current divider circuit 475 electrically coupled to the output of the second transconductance amplifier circuit 465 to divide the output current of the second transconductance amplifier circuit 465.

Figure 5:
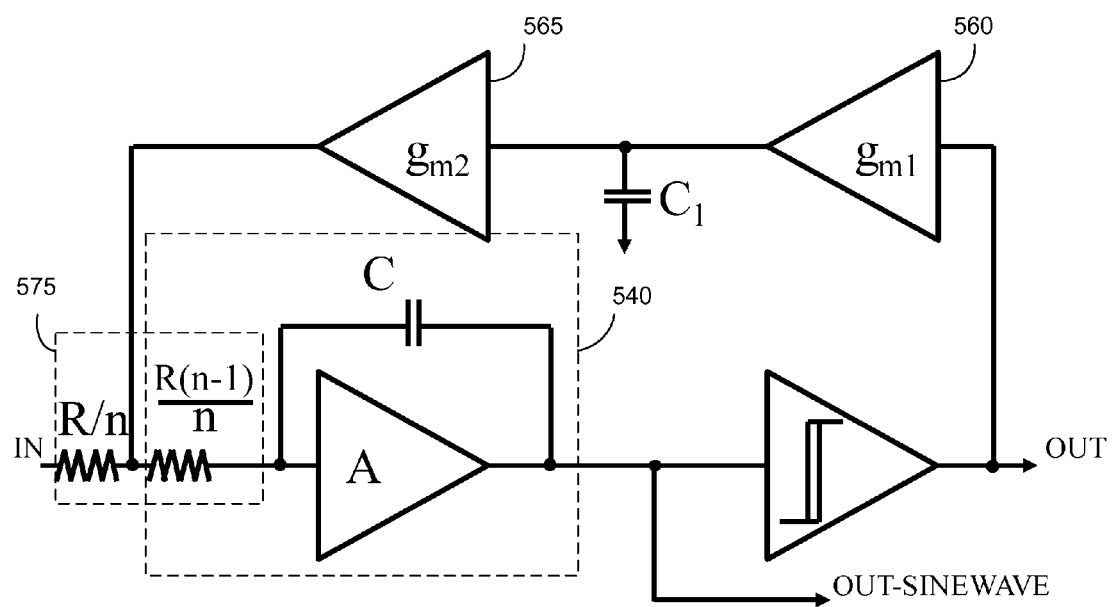
FIG. 5 is a circuit diagram of portions of yet another example of a drive signal circuit.

FIG. 5 is a circuit diagram of portions of another example of a drive signal circuit having a feedback loop that includes a first transconductance amplifier circuit 560 and a second transconductance amplifier circuit 565. The drive signal circuit includes a resistive divider circuit 575 electrically coupled to the output of the second transconductance amplifier circuit 565 and the input of the phase-shift circuit 540 to divide the output current of the second transconductance amplifier circuit 565.

Figure 6:
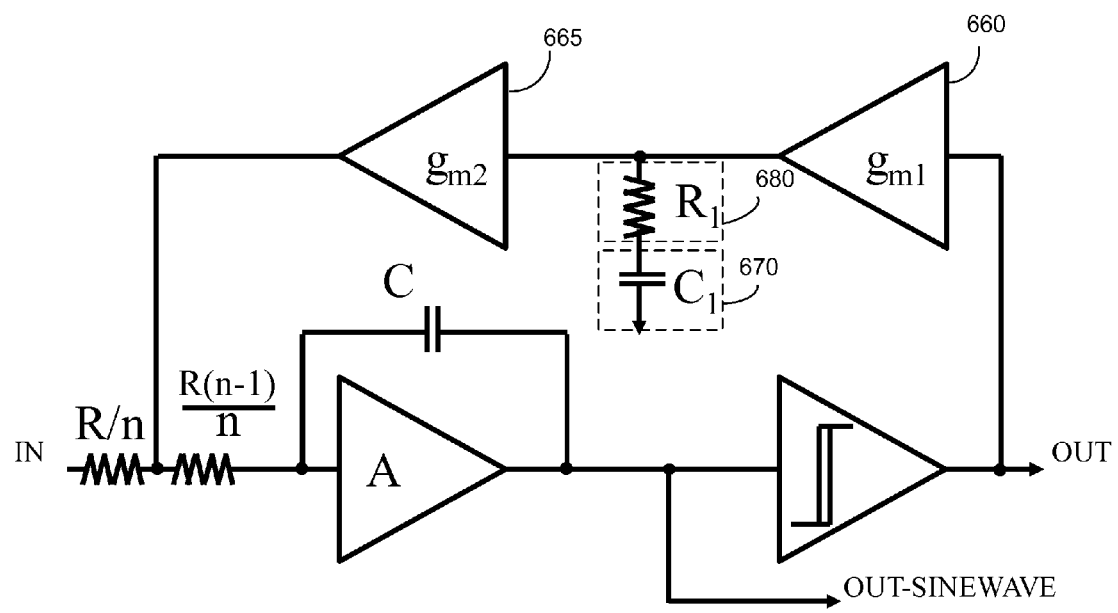
FIG. 6 is a circuit diagram of portions of still another example of a drive signal circuit.

The amplifier of the feed-forward integrator circuit should have low gain to provide good phase margin during large input signal operation. An alternative approach is to use a high gain amplifier but change configuration of the feedback loop. FIG. 6 is a circuit diagram of portions of another example of a drive signal circuit having a feedback loop that includes a first transconductance amplifier circuit 660 and a second transconductance amplifier circuit 665. The second transconductance amplifier circuit 665 has an input electrically coupled to an output of the first transconductance amplifier circuit and has an output electrically coupled to an input of the integrator amplifier circuit. The feedback loop also includes a resistor 680 coupled to the output of the first transconductance amplifier circuit 660 and a capacitor 670 coupled to the resistor 680 and circuit ground. This compensation resistor $R_1$ adds a zero to the feedback transfer function. This adds phase lead to improve the phase margin for high amplitude input signals.

Figure 7:
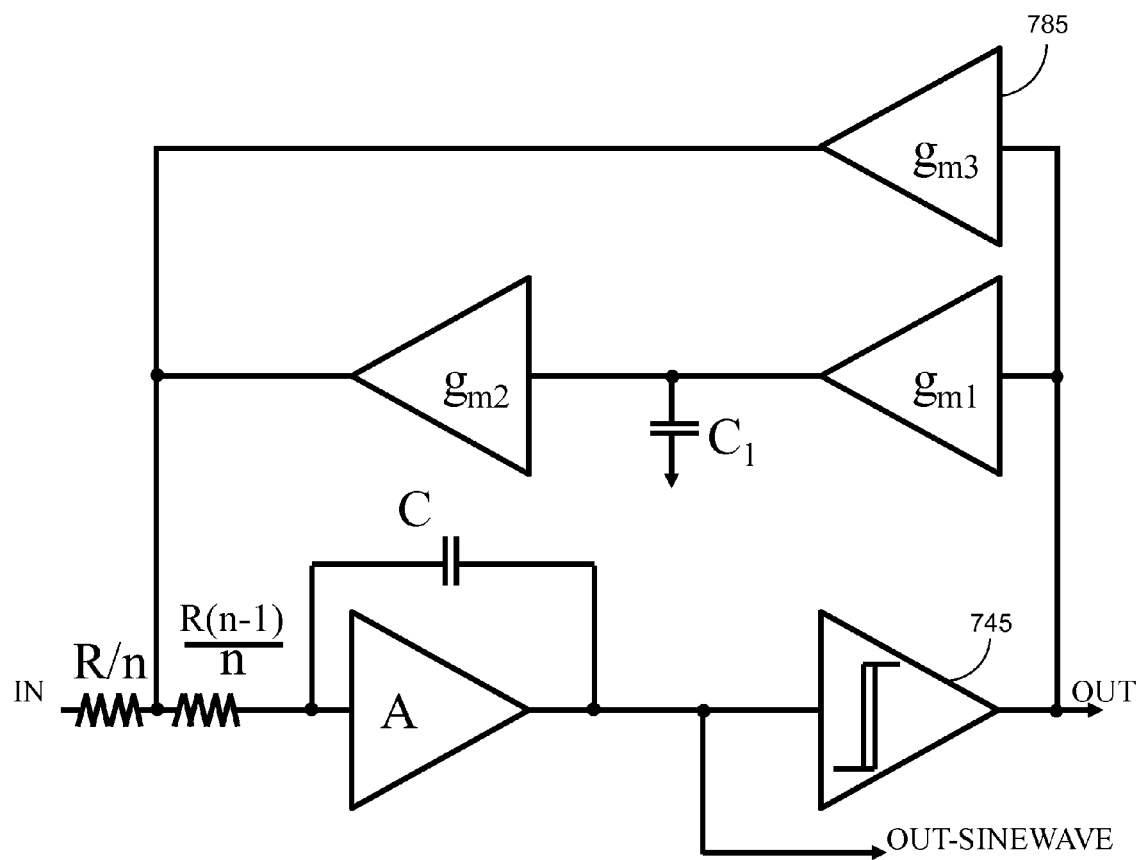
FIG. 7 is a circuit diagram of portions of still another example of a drive signal circuit.

The values of the compensation resistor to provide an effective zero in the feedback may be too large for implementation on an IC. FIG. 7 is a circuit diagram of portions of still another example of a drive signal circuit having a feedback loop that includes a third transconductance amplifier circuit 785. The input of the third transconductance amplifier circuit 785 is electrically coupled to the output of a comparator circuit 745 and an input of the integrator amplifier circuit to form a second parallel feedback loop. This added transconductance stage eliminates the need for a large compensation resistor and can provide the effective zero to provide phase lead and improve the phase margin high amplitude input signals.

Figure 8:
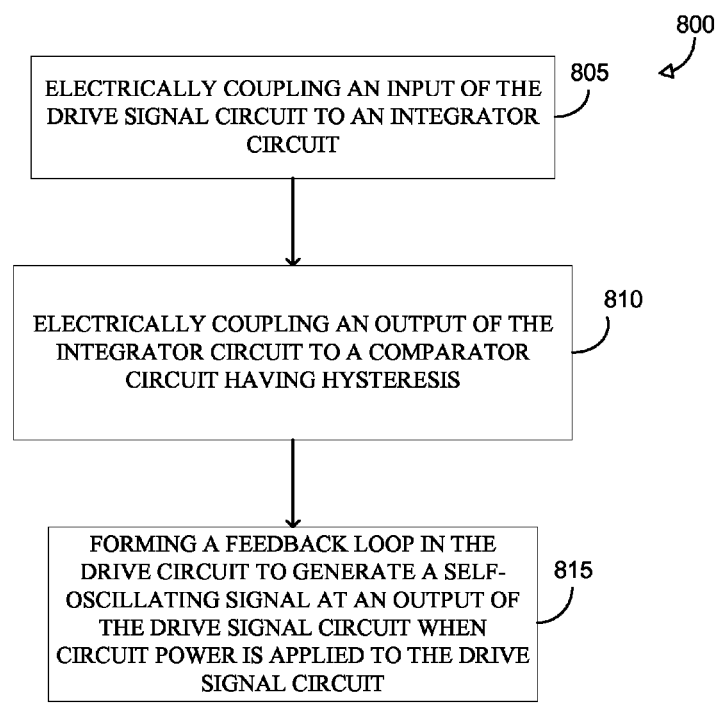
FIG. 8 is a flow diagram of an example of a method of forming a drive signal circuit for a MEMS sensor.

FIG. 8 is a flow diagram of an example of a method 800 of forming a drive signal circuit for a MEMS sensor. At block 805, an input of the drive signal circuit is electrically coupled to an input of an integrator circuit. The integrator circuit can have the circuit topology as shown in the examples herein. At block 810, the output of the integrator circuit is electrically coupled to a comparator circuit having hysteresis.

At block 815, a feedback loop in the drive signal circuit is formed to generate a self-oscillating signal at an output of the drive signal circuit when circuit power is applied to the drive signal circuit. The feedback loop extends from the output of the comparator circuit to an input of an amplifier (e.g., an operation amplifier or opamp) of the integrator circuit. The integrator circuit shifts the phase angle of an input signal received at the input to the drive signal circuit by substantially ninety degrees. The received input signal is generated in response to applying the self-oscillating signal to a drive input of the MEMS sensor. The drive signal circuit can be electrically coupled to a capacitance-to-voltage converter circuit, and the input signal can be a voltage signal converted from charge generated by the MEMS sensor in response to applying the self-oscillating signal to the MEMS sensor.

The drive signal circuit provides reliable self-startup to provide a drive oscillation signal and also reliably provides a 50% duty cycle. The drive signal circuit further provides an accurate 90° phase shift that avoids the noise associated with differentiator phase-shifters.

ADDITIONAL NOTES AND EXAMPLES

Example 1 can include subject matter (such as an apparatus) comprising a drive signal circuit for a micro-electromechanical system (MEMS) sensor. The drive signal circuit includes an input configured to receive a voltage signal representative of charge generated by the MEMS sensor, a phase-shift circuit electrically coupled to the input and configured to phase shift an input signal by substantially ninety degrees, a comparator circuit with hysteresis, and a feedback loop extending from the output of the drive signal circuit to the input of the phase-shift circuit. The comparator circuit can be electrically coupled to an output of the phase-shift circuit, and an output of the comparator circuit is electrically coupled to an output of the drive signal circuit. The feedback loop can be configured to generate a self-oscillating signal at an output of the drive signal circuit, and the output signal generated by the drive signal circuit is applied to a drive input of the MEMS sensor.

Example 2 can include, or can optionally be combined with the subject matter of Example 1 to optionally include, a first transconductance amplifier circuit having an input electrically coupled to the output of the comparator circuit, a second transconductance amplifier circuit having an input electrically coupled to an output of the first transconductance amplifier circuit and an output electrically coupled to an input of the phase-shift circuit, and a capacitor coupled to the output of the first transconductance amplifier circuit and circuit ground.

Example 3 can include, or can optionally be combined with the subject matter of one or any combination of Examples 1 and 2 to optionally include a current divider circuit electrically coupled to the output of the second transconductance amplifier circuit.

Example 4 can include, or can optionally be combined with the subject matter of one or any combination of Examples 1-3 to optionally include, a resistive divider circuit electrically coupled to the output of the second transconductance amplifier circuit and the input of the phase-shift circuit, wherein the resistive divider is configured to divide the output current of the second transconductance amplifier circuit.

Example 5 can include, or can optionally be combined with the subject matter of one or any combination of Examples 1-4 to optionally include, a phase-shift circuit that includes an integrator circuit that includes an amplifier circuit, and the feedback loop optionally electrically coupled from the output of the comparator circuit to an input of the integrator amplifier circuit.

Example 6 can include, or can optionally be combined with the subject matter of Example 5 to optionally include, an integrator amplifier circuit that provides controlled signal gain for direct current (DC) signals.

Example 7 can include, or can optionally be combined with the subject matter of one or any combination of Examples 5 and 6 to include a third transconductance amplifier circuit, and an input of the third transconductance amplifier circuit is electrically coupled to the output of the comparator circuit and an input of the integrator amplifier circuit to form a second feedback loop.

Example 8 can include, or can optionally be combined with the subject matter of one or any combination of Examples 5-7 to optionally include a feedback loop having a first transconductance amplifier circuit having an input electrically coupled to the output of the comparator circuit, a second transconductance amplifier circuit having an input electrically coupled to an output of the first transconductance amplifier circuit and having an output electrically coupled to an input of the integrator amplifier circuit, a resistor coupled to the output of the first transconductance amplifier circuit, and a capacitor coupled to the resistor and circuit ground.

Example 9 can include, or can optionally be combined with the subject matter of one or any combination of Examples 1-8 to optionally include, the MEMS sensor, wherein the MEMS sensor includes a MEMS gyro.

Example 10 can include, or can optionally be combined with the subject matter of one or any combination of Examples 1-9 to include, subject matter (such as a method, a means for performing acts, or a machine readable medium including instructions that, when performed by the machine, can cause the machine to perform acts) comprising self-generating an oscillating signal at an output of a drive signal circuit and applying the oscillating signal to a drive input of the MEMS sensor, receiving, at an input of the drive signal circuit, a voltage signal representative of charge generated by the MEMS sensor in response to applying the oscillation signal to the drive input of the MEMS sensor, shifting the phase of the received voltage signal by substantially ninety degrees and using the phase shifted signal to generate the drive signal, and applying the generated drive signal to the drive input of the MEMS sensor.

Example 11 can include, or can optionally be combined with the subject matter of Example 10 to optionally include integrating the received voltage signal using an integrator circuit.

Example 12 can include or can optionally be combined with the subject matter of Example 11 to optionally include, applying the integrated received voltage signal to a comparator circuit with hysteresis and feeding back the output of the comparator circuit to an input of an amplifier of the integrator circuit to form a feedback loop.

Example 13 can include, or can optionally be combined with the subject matter of Example 12 to optionally include, charging, through a first transconductance amplifier circuit, a capacitor using the output of the comparator circuit, and applying the charge of the capacitor to an input of the amplifier of the integrator circuit through a second transconductance amplifier circuit.

Example 14 can include, or can optionally be combined with the subject matter of one or any combination of Example 13 to optionally include dividing the output current of the second transconductance amplifier circuit to reduce the transconductance of the second transconductance amplifier circuit.

Example 15 can include, or can optionally be combined with the subject matter of one or any combination of Examples 13 and 14 to optionally include electrically coupling an output of the comparator circuit to an input of a third transconductance amplifier circuit and electrically coupling an output of the third transconductance amplifier circuit to an input of the amplifier circuit of the integrator circuit to form a second feedback loop.

Example 16 can include, or can optionally be combined with the subject matter of one or any combination of Examples 13-15 to optionally include includes charging the capacitor through the first transconductance amplifier and a resistor.

Example 17 can include, or can optionally be combined with the subject matter of one or any combination of Examples 11-16 to optionally include, applying the generated drive signal to a drive input of an MEMS gyro sensor.

Example 18 can include, or can optionally be combined with the subject matter of one or any combination of Examples 1-17 to include, subject matter (such as a method, a means for performing acts, or a machine readable medium including instructions that, when performed by the machine, can cause the machine to perform acts) comprising electrically coupling an input of the drive signal circuit to an integrator circuit, electrically coupling an output of the integrator circuit to a comparator circuit having hysteresis, and forming a feedback loop in the drive circuit to generate a self-oscillating signal at an output of the drive signal circuit when circuit power is applied to the drive signal circuit, wherein the feedback loop extends from the output of the comparator circuit to an input of an amplifier of the integrator circuit. The integrator circuit shifts the phase angle of an input signal received at the input to the drive signal circuit by substantially ninety degrees, and the input signal is generated in response to applying the self-oscillating signal to a drive input of the MEMS sensor.

Example 19 can include, or can optionally be combined with the subject matter of Example 18 to optionally include, electrically coupling the output of the comparator circuit to a capacitor through a first transconductance amplifier circuit and electrically coupling the capacitor to the phase-shift circuit using a second transconductance amplifier.

Example 20 can include, or can optionally be combined with the subject matter of Example 19 to optionally include, electrically coupling a current divider circuit to the output of the second transconductance amplifier.

Example 21 can include, or can optionally be combined with the subject matter of one or any combination of Examples 18-20 to optionally include, electrically coupling a resistive divider circuit at the input to the integrator circuit.

Example 22 can include, or can optionally be combined with the subject matter of one or any combination of Examples 18-21 to optionally include an amplifier circuit having controlled signal gain for DC signals.

Example 23 can include, or can optionally be combined with the subject matter of one or any combination of Examples 18-22 to optionally include, electrically coupling an output of the comparator circuit to an input of a third transconductance amplifier circuit and electrically coupling an output of the third transconductance amplifier circuit to an input of the amplifier circuit of the integrator circuit to form a second feedback loop.

Example 24 can include, or can optionally be combined with the subject matter of one or any combination of Examples 18-23 to optionally include, generating the input signal in response to applying the self-oscillating signal to a drive input of an MEMS gyro.

Example 25 can include, or can optionally be combined with any portion or combination of portions of any one or more of Examples 1-24 to include, subject matter that can include means for performing any one or more of the functions of Examples 1-24, or a machine readable medium including instructions that, when performed by a machine, cause the machine to perform any one or more of the functions of Examples 1-24.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first,"

"second," and "third," etc. are used merely as labels, and are not intended to impose numerical requirements on their objects.

The above description is intended to be illustrative, and not restrictive. The above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus comprising:
  a drive signal circuit for a micro-electromechanical system (MEMS) sensor, the drive signal circuit comprising:
    an input configured to receive a voltage signal representative of charge generated by the MEMS sensor;
    a phase-shift circuit electrically coupled to the input and configured to phase shift an input signal by substantially ninety degrees;
    a comparator circuit with hysteresis, wherein an input of the comparator is electrically coupled to an output of the phase-shift circuit and an output of the comparator circuit is electrically coupled to an output of the drive signal circuit; and
    a feedback loop extending from the output of the drive signal circuit to the input of the phase-shift circuit, wherein the feedback loop is configured to generate a self-oscillating signal at an output of the drive signal circuit, and
  wherein an output signal generated by the drive signal circuit is applied to a drive input of the MEMS sensor.

2. The apparatus of claim 1, wherein the feedback loop includes:
  a first transconductance amplifier circuit having an input electrically coupled to the output of the comparator circuit;
  a second transconductance amplifier circuit having an input electrically coupled to an output of the first transconductance amplifier circuit and an output electrically coupled to an input of the phase-shift circuit; and
  a capacitor coupled to the output of the first transconductance amplifier circuit and circuit ground.

3. The apparatus of claim 1, including a current divider circuit electrically coupled to the output of the second transconductance amplifier circuit.

4. The apparatus of claim 2, including a resistive divider circuit electrically coupled to the output of the second transconductance amplifier circuit and the input of the phase-shift circuit, wherein the resistive divider is configured to divide the output current of the second transconductance amplifier circuit.

5. The apparatus of claim 1,
  wherein the phase-shift circuit includes an integrator circuit that includes an amplifier circuit, and
  wherein the feedback loop is electrically coupled from the output of the comparator circuit to an input of the integrator amplifier circuit.

6. The apparatus of claim 5, wherein the integrator amplifier circuit provides controlled signal gain for direct current (DC) signals.

7. The apparatus of claim 5, including:
  a third transconductance amplifier circuit, and
  wherein an input of the third transconductance amplifier circuit is electrically coupled to the output of the comparator circuit and an input of the integrator amplifier circuit to form a second feedback loop.

8. The apparatus of claim 5,
  wherein the feedback loop includes:
    a first transconductance amplifier circuit having an input electrically coupled to the output of the comparator circuit;
    a second transconductance amplifier circuit having an input electrically coupled to an output of the first transconductance amplifier circuit and having an output electrically coupled to an input of the integrator amplifier circuit;
    a resistor coupled to the output of the first transconductance amplifier circuit; and
    a capacitor coupled to the resistor and circuit ground.

9. The apparatus of claim 1, including the MEMS sensor, wherein the MEMS sensor includes a MEMS gyro.

10. A method of generating a drive signal for a MEMS sensor, the method comprising:
  self-generating an oscillating signal at an output of a drive signal circuit and applying the oscillating signal to a drive input of the MEMS sensor;
  receiving, at an input of the drive signal circuit, a voltage signal representative of charge generated by the MEMS sensor in response to applying the oscillation signal to the drive input of the MEMS sensor;
  shifting the phase of the received voltage signal by substantially ninety degrees and using the phase shifted signal to generate the drive signal; and
  applying the generated drive signal to the drive input of the MEMS sensor.

11. The method of claim 10, wherein shifting the phase of the received voltage signal by substantially ninety degrees includes integrating the received voltage signal using an integrator circuit.

12. The method of claim 11, wherein self-generating an oscillating signal includes applying the integrated received voltage signal to a comparator circuit with hysteresis and feeding back the output of the comparator circuit to an input of an amplifier of the integrator circuit to form a feedback loop.

13. The method of claim 12, wherein feeding back the output of the comparator circuit includes:
  charging, through a first transconductance amplifier circuit, a capacitor using the output of the comparator circuit; and
  applying the charge of the capacitor to an input of the amplifier of the integrator circuit through a second transconductance amplifier circuit.

14. The method of claim 13, including dividing the output current of the second transconductance amplifier circuit to reduce the transconductance of the second transconductance amplifier circuit.

15. The method of claim 13, wherein feeding back the output of the comparator circuit includes electrically coupling an output of the comparator circuit to an input of a third transconductance amplifier circuit and electrically coupling an output of the third transconductance amplifier circuit to an input of the amplifier circuit of the integrator circuit to form a second feedback loop.

16. The method of claim 13, wherein charging the capacitor includes charging the capacitor through the first transconductance amplifier and a resistor.

17. The method of claim 10, wherein applying the generated drive signal to the drive input of the MEMS sensor includes applying the generated drive signal to a drive input of an MEMS gyro sensor.

18. A method of forming a drive signal circuit for a MEMS sensor, the method comprising:
   electrically coupling an input of the drive signal circuit to an integrator circuit;
   electrically coupling an output of the integrator circuit to a comparator circuit having hysteresis; and
   forming a feedback loop in the drive circuit to generate a self-oscillating signal at an output of the drive signal circuit when circuit power is applied to the drive signal circuit, wherein the feedback loop extends from the output of the comparator circuit to an input of an amplifier of the integrator circuit,
   wherein the integrator circuit shifts the phase angle of an input signal received at the input to the drive signal circuit by substantially ninety degrees, and wherein the input signal is generated in response to applying the self-oscillating signal to a drive input of the MEMS sensor.

19. The method of claim 18, wherein forming the feedback loop includes electrically coupling the output of the comparator circuit to a capacitor through a first transconductance amplifier circuit and electrically coupling the capacitor to the phase-shift circuit using a second transconductance amplifier.

20. The method of claim 19, including electrically coupling a current divider circuit to the output of the second transconductance amplifier.

21. The method of claim 20, including electrically coupling a resistive divider circuit at the input to the integrator circuit.

22. The method of claim 18, wherein the integrator circuit includes an amplifier circuit having controlled signal gain for direct current (DC) signals.

23. The method of claim 18, wherein forming a feedback loop includes electrically coupling an output of the comparator circuit to an input of a third transconductance amplifier circuit and electrically coupling an output of the third transconductance amplifier circuit to an input of the amplifier circuit of the integrator circuit to form a second feedback loop.

24. The method of claim 18, wherein the input signal is generated in response to applying the self-oscillating signal to a drive input of an MEMS gyro.

* * * * *